United States Patent [19]

Sugihara

[11] Patent Number: 5,688,342
[45] Date of Patent: Nov. 18, 1997

[54] PNEUMATIC TIRE HAVING GROUND CONTACTING AREA

[75] Inventor: Hideaki Sugihara, Kobe, Japan

[73] Assignee: Sumitomo Rubber Industries, Ltd., Hyogo-ken, Japan

[21] Appl. No.: 363,822

[22] Filed: Dec. 27, 1994

[30] Foreign Application Priority Data

Dec. 27, 1993 [JP] Japan ..................... 5-350822

[51] Int. Cl.$^6$ .................. B60C 101/00; B60C 111/00
[52] U.S. Cl. .................. 152/209 R; 152/209 A; 152/454; 152/456
[58] Field of Search .................. 152/209 R, 209 D, 152/454, 209 A, 456

[56] References Cited

U.S. PATENT DOCUMENTS

| | | |
|---|---|---|
| D. 330,882 | 11/1992 | Hasegawa . |
| 1,664,352 | 3/1928 | Coleman ..................... 152/209 R |
| 4,044,810 | 8/1977 | Taniguchi et al. . |
| 4,947,911 | 8/1990 | Ushikubo et al. . |
| 4,986,324 | 1/1991 | Suzuki et al. . |
| 5,042,546 | 8/1991 | Forney et al. ..................... 152/454 |
| 5,105,864 | 4/1992 | Watanabe et al. . |
| 5,222,537 | 6/1993 | Saito et al. ..................... 152/209 R |
| 5,323,824 | 6/1994 | Swift et al. . |
| 5,327,952 | 7/1994 | Glover et al. ..................... 152/209 R |
| 5,337,815 | 8/1994 | Graas ..................... 152/209 R |
| 5,595,619 | 1/1997 | Tanaka ..................... 152/456 |

FOREIGN PATENT DOCUMENTS

| | | |
|---|---|---|
| 0323519 | 7/1989 | European Pat. Off. . |
| 0391300 | 4/1990 | European Pat. Off. . |
| 0435620 | 7/1991 | European Pat. Off. . |
| 0593288 | 10/1993 | European Pat. Off. . |
| 593288 | 4/1994 | European Pat. Off. ........... 152/209 R |
| 634594 | 2/1928 | France . |
| 2608516 | 12/1987 | France . |
| 2672847 | 2/1992 | France . |
| 3048489 | 10/1981 | Germany . |
| 3525394 | 1/1986 | Germany . |
| 87302 | 4/1988 | Japan ..................... 152/454 |
| 2045203 | 2/1990 | Japan . |
| 2182505 | 7/1990 | Japan . |
| 3038408 | 2/1991 | Japan . |
| 3074208 | 3/1991 | Japan . |
| 132402 | 6/1991 | Japan ..................... 152/209 R |
| 3169719 | 7/1991 | Japan . |
| 6-183208 | 7/1994 | Japan . |
| 357419 | 9/1931 | United Kingdom ............... 152/209 R |
| 1255952 | 12/1971 | United Kingdom . |
| 2178380 | 2/1987 | United Kingdom . |
| 2221877 | 2/1990 | United Kingdom . |

OTHER PUBLICATIONS

Translation of Japan 63–87302.
Patent Abstract of Japan vol. 016, No. 299 (M–1274) 2 Jul. 1992 & JP-A-04 081 305 (Bridgestone Corp.) 16 Mar. 1992.
Patent Abstracts of Japan vol. 016, No. 041 (M–1206) 21 Jan. 1992 & JP-A-03 246 104 (Bridgestone Corp.).
"Time Materials and Construction," K. Jost, Automotive Engineering, Oct. 1992.

*Primary Examiner*—Steven D. Maki
*Attorney, Agent, or Firm*—Birch, Stewart, Kolasch & Birch, LLP

[57] ABSTRACT

A pneumatic tire has a tread part with two wide circumferential grooves extending in either side of the tire's equator so as to divide the tread part into a pair of shoulder parts and a central part. The central part has a surface utilizing successive convex curves of a pair of inner groove walls and a central ground-contact surface. When the tire is mounted on a regular rim, inflated with regular internal pressure and applied with normal load, a ground-contacting area Fc where the central part contacts with the ground has a length Lc in the tire's circumferential direction which is 0.9 to 1.1 times a length Ls in the tire's circumferential direction of a ground-contacting area FS where the shoulder part contacts with the ground.

11 Claims, 14 Drawing Sheets

Fig. 15
CONVENTIONAL

PNEUMATIC TIRE HAVING GROUND CONTACTING AREA

BACKGROUND OF THE INVENTION

The present invention relates to a pneumatic tire, particularly a low aspect radial tire for passenger vehicles, capable of providing higher wet grip performance, reducing tire noise and maintaining steering stability.

FIELD OF THE INVENTION

Recently, as automobiles become quieter tire noise has come to contribute at a higher ratio to the total noise level of an automobile, and its reduction is demanded. Such noise reduction is specifically desired in a range around 1 kHz which and sounds due to a columnar resonance generated by circumferential grooves is one of the main sound sources in such high frequency range.

On the other hand, in order to maintain the wet grip performance, the tire tread is generally provided with plural circumferential grooves continuously extending in the circumferential direction of tire.

In such a tire, when it is in contact with the ground, a kind of air column is formed by the road surface and the circumferential groove. Then a sound of specific wavelength, which is double the wave length of the air column is caused by airflow within the column during running.

Such a phenomenon is referred to as a columnar resonance, and provides the main source of noise at 800 to 1.2 kHz. The wavelength of the columnar resonance sound is approximately constant to give a constant frequency regardless of the tire's speed, and then increases sound inside and outside an automobile.

In order to prevent the columnar resonance, although reduction of the number or volume of the circumferential grooves is known, such reductions lead to a lower wet grip performance.

On the other hand, although the wet grip performance can be increased contrarily by increasing the number or volume of circumferential grooves, a simple increase causes reduction of the dry grip performance, because the ground-contact area is reduced. Also, this causes a reduction of steering stability as the rigidity of tread pattern is reduced, in addition to the increase in tire noise.

Conventionally, tire's performances have been adjusted by sacrificing one or more performances factors.

SUMMARY OF THE INVENTION

It is hence a primary object of the invention to provide a pneumatic tire having improved wet grip performance without loss of dry grip performance or steering stability, and yet having reduced noise.

According to one aspect of the present invention, a pneumatic tire comprising a tread part having two circumferential grooves continuously extending in the circumferential direction in either side of the tire's equator so as to divide the tread part into a pair of shoulder parts, which are located outside outer bottom edges of the circumferential grooves in the axial direction of tire, and a central part, which is located between inner bottom edges of the circumferential grooves in the axial direction of tire; wherein the central part has a surface comprising successive convex curves composed of a pair of inner groove walls extending inside, in the axial direction of tire, along a curve convex outwardly in the radial direction from the inner bottom edges of the circumferential grooves and a central ground-contacting surface smoothly connected between the pair of the inner groove walls, the central ground-contacting surface is substantially in contact with a virtual tread line between outer surfaces of the shoulder parts, and when the tire is mounted on a regular rim, inflated with regular internal pressure and applied with normal load, a ground-contacting area Fc where the central part contacts with the ground has a length Lc in the tire's circumferential direction which is 0.9 to 1.1 times a length Ls in the tire's circumferential direction of a ground-contacting area FS where the shoulder part contacts with the ground.

Figure 7:
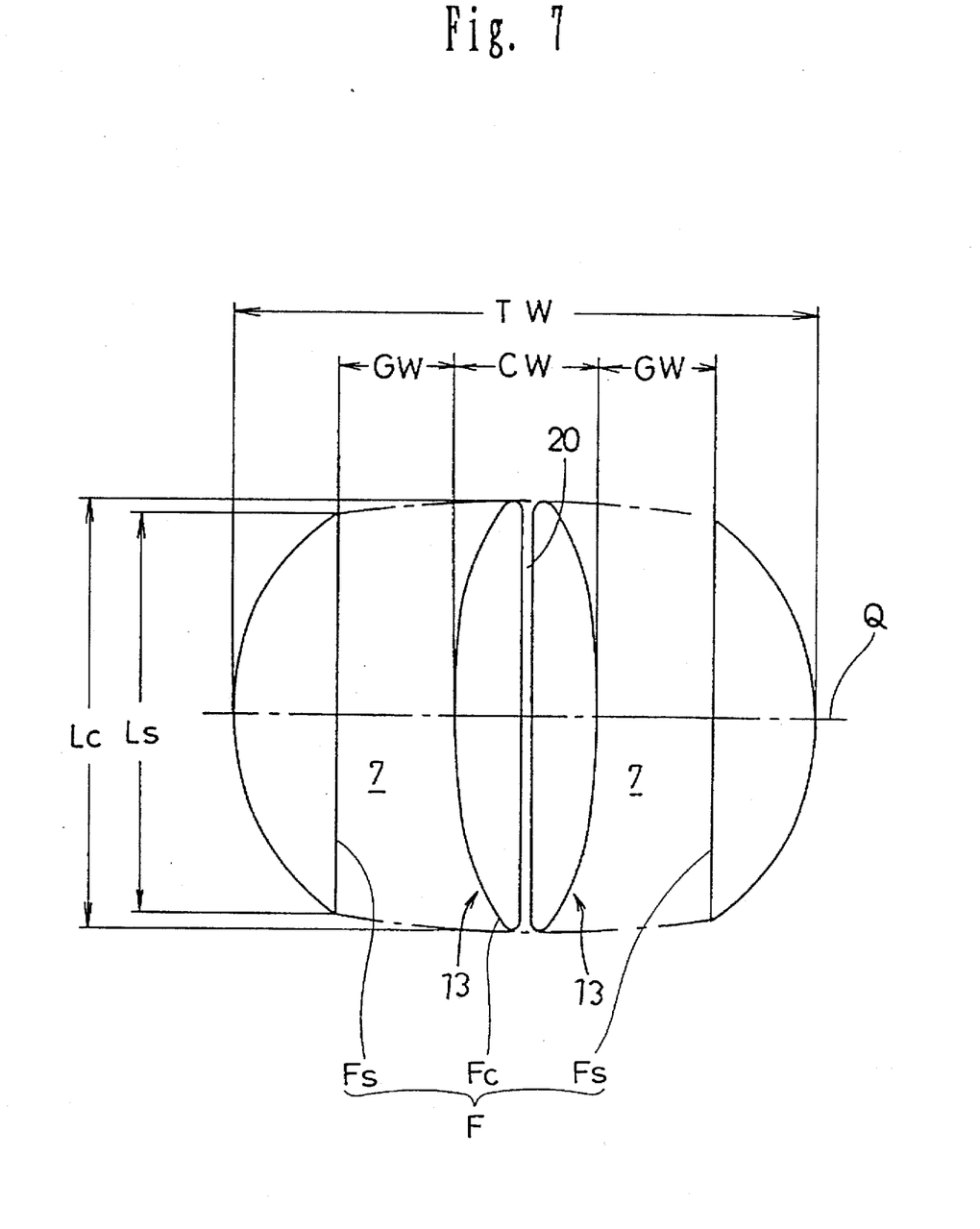
FIG. 7 is a plan view showing a ground-contacting tread area of an embodiment of the invention when a normal load is applied.

In the invention, as the groove depth of the circumferential groove is gradually increased toward the outside in the tire's axial direction because of the surface of the central part formed by a convex curve, the draining performance is increased, thereby improving the wet grip performance. The circumferential groove, also, forms widened parts as shown in FIG. 7 at the front and the back of a ground-contacting center Q, when the tire comes in contact with the ground. Then, this widened parts prevent the columnar resonance and reduce the tire noise effectively. In addition, the convex form of the central part contributes to heightening of stiffness of the central part, and since the ground-contacting length Lc of the central part is in a range of 0.9 to 1.1 times the ground-contacting length Ls of the shoulder part, the steering stability is enhanced, and the ground-contacting performance in a limited ground-contacting width is improved.

BRIEF DESCRIPTION OF THE DRAWINGS

An embodiment of the present invention will now be described, by way of example, referring to the attached diagrammatic drawings, in which.

DETAILED DESCRIPTION OF THE INVENTION

Figure 1:
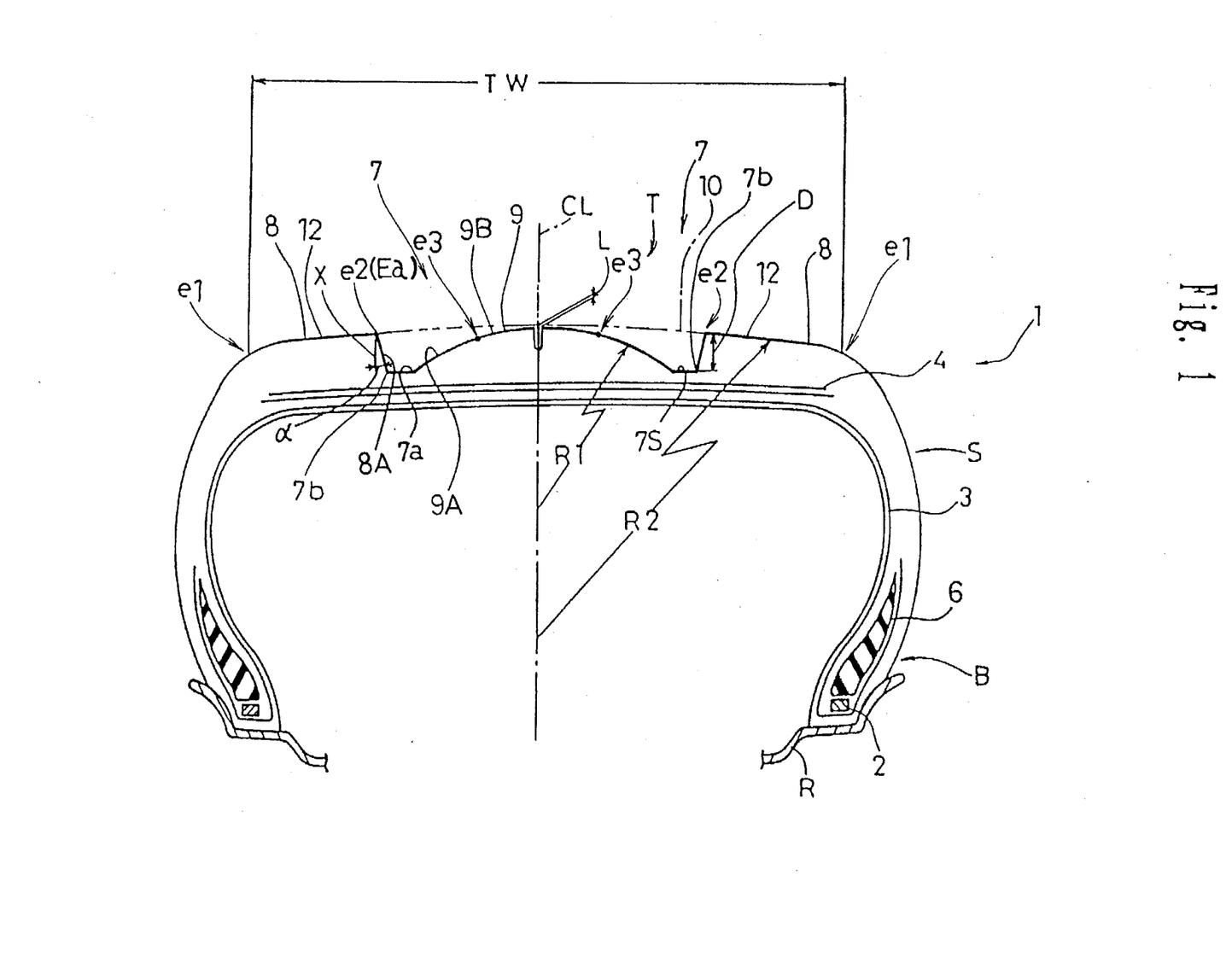
FIG. 1 is a sectional view showing an embodiment of the invention.

FIG. 1 shows a tire 1 of the invention in its normal state mounted on its regular rim R and inflated with regular internal pressure. The regular rim is the rim officially approved for the tire by for example JATMA (Japan), TRA (USA), ETRTO (Europe) and the like; the regular internal pressure is the maximum air pressure for the tire officially specified in Air-pressure/Max.-loads Table by for example JATMA, TRA, ETRTO and the like; and a normal load is the maximum load for the tire officially specified in Air-pressure/Max.-loads Table by for example JATMA, TRA, ETRTO and the like.

The tire 1 comprises a pair of bead parts B each having a bead core 2, sidewall parts S extending from the bead parts B outwardly in the radial direction of tire, and a tread part T linking their outer ends. The aspect ratio is between 0.4 and 0.6 to provide low aspect tire for passenger vehicles. (Aspect ratio=sectional height/tire width.)

A radial carcass 3 extends between the bead parts B. The edges of the carcass 3 are folded back from inside to outside one around the bead core 2, and a belt layer 4 is provided above the carcass 3 and radially inwards of the tread part T.

In addition, a rubber bead apex 6 extending radially outward from each bead core 2 is provided between the main part of the carcass 3 and the folded back part thereof so as to maintain the shape and rigidity of the bead part B.

The belt layer 4 comprises plural belt plies of cords aligned at an angle of 15 to 30 degrees to the tire equator CL and coated by a topping rubber. The belt cords have a high tensile strength, such as steel or aromatic polyamide, and are arranged to cross to each other between the belt plies. For the carcass cords, in the case of a tire for passenger vehicles, such organic fiber cords as nylon, rayon and polyester may be generally employed.

The tread part has two wide circumferential grooves 7, which are positioned one at either side of the tire's equator CL and then continuously extend substantially in the circumferential direction, so that the tread part T is divided into a pair of shoulder parts 8 and a central part 9. The shoulder part 8 is defined as the region outside an outer bottom edge 7b of the circumferential groove 7 in the axial direction of tire. The central part 9 is defined as the region between the inner bottom edges 7a, 7a of the circumferential grooves 7 in the axial direction of tire. The circumferential grooves 7 are positioned symmetrically about the tire's equatorial surface. The two circumferential grooves 7 have a same groove depth D to each other, and this groove depth D is set in a range of 4 to 8% of a ground-contacting width TW of the tread such as 7.5 to 15.0 mm, preferably 8.4 mm for a tire of 205/55R15 in size.

The central part 9 has a surface with a smooth convex curve composed of a pair of inner groove walls 9A extending inside in the axial direction of tire along a curve convexed outwardly in the radial direction of tire from the inner bottom edges 7a of the grooves 7 and a central ground-contacting surface 9B smoothly connected between the inner groove walls 9A, 9A.

Figure 4:
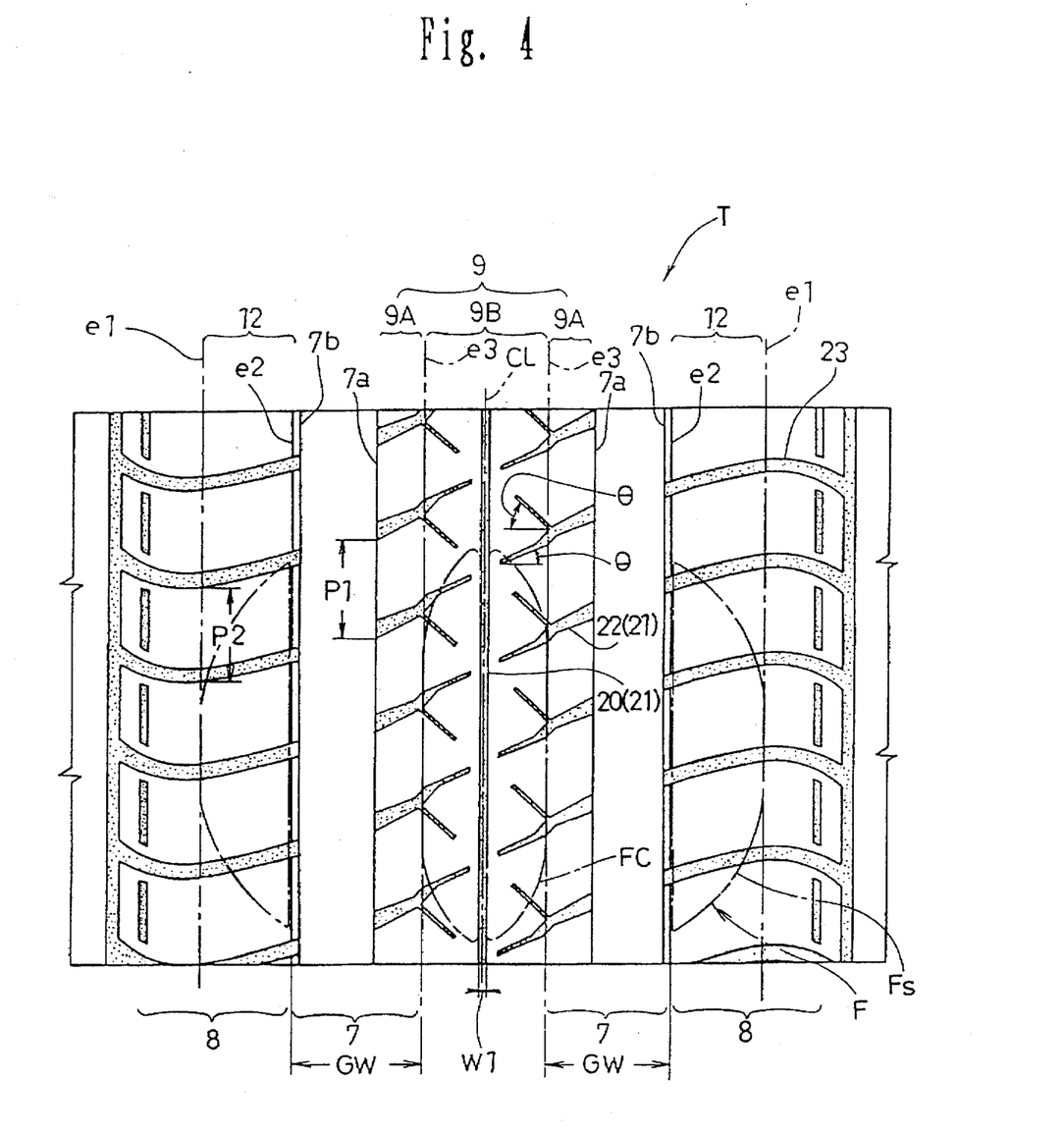
FIG. 4 is a partial flat view showing a tread pattern.

Incidentally, when a normal load is applied to the tire in the normal state, as shown in FIG. 4, a ground-contacting tread area F where the tread T contacts with the ground is obtained. The ground-contacting tread area F has a ground-contacting area Fc of the central part 9 having a thin elliptic form and ground-contacting areas Fs of the shoulder parts 8 having a semicircular form. Then, the central ground-contacting surface 9B is defined as a part of the tread surface between the circumferential lines e3, e3 passing the axially outer edge of the ground-contacting area Fc. A shoulder ground-contacting surface 12 is defined as a part of the tread surface between the circumferential lines e1, e2 passing the axially outer and inner edges of the ground-contacting area Fs. The ground-contacting width TW is defined as an axially length between the circumferential lines e1, e1. The shoulder ground-contacting surface 12 is also crossed by an outer groove wall 8a extending radially outside from the outer bottom edge 7b of the groove 7, thus, the circumferential groove 7 is defined by the groove bottom 7S and inner and outer groove wall 9A, 8A. The groove width GW of the circumferential groove 7 is defined as an axially length between the circumferential lines e2, e3.

Figure 3A:
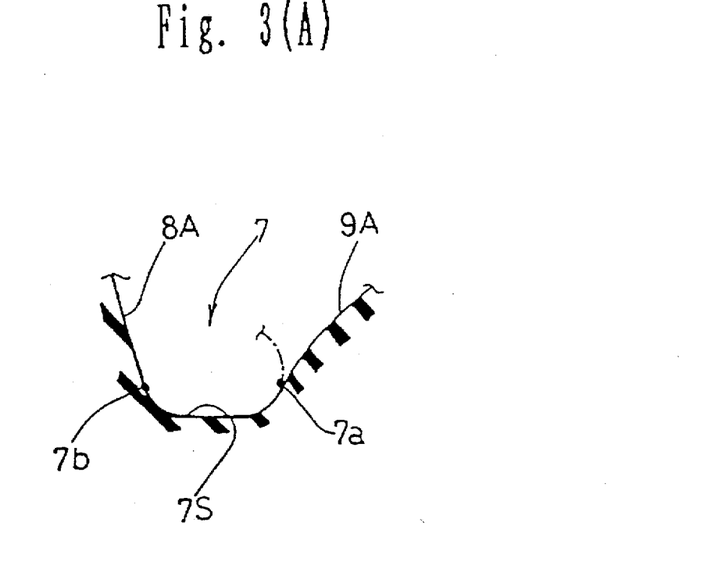
FIG. 3(A) is an enlarged partial sectional view for explanation of groove bottom ends.
Figure 3B:
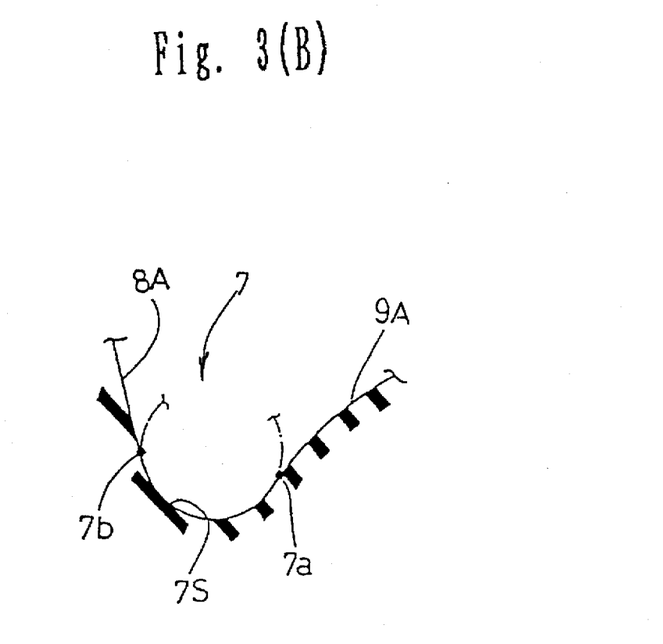
FIG. 3(B) is an enlarged partial sectional view for explanation of groove bottom ends.

The groove bottom edges 7a, 7b may be formed, when the groove bottom 7S is approximately a flat surface as in the embodiment, as bending points between the groove bottom 7S and groove walls 8A, 9A. When the groove bottom 7S is a concaved surface as shown in FIGS. 3(A) and 3(B), the groove bottom edges 7a, 7b may be formed as bending points or inflection points.

The central ground-contacting surface 9B is substantially in contacting with a virtual tread line 10 connected between the shoulder ground-contacting surfaces 12.

Here, the expression "substantially in contact" means that a minimum distance L between the central ground-contacting surface 9B and the virtual tread line 10 is less than 2% of the ground-contacting tread width TW. If it is 2% or more, because the difference between the ground-contacting pressures of the shoulder part and central part is increased, the grip performance is reduced, and the wear resistance is affected. Thus, it should be preferably 1% or less, more preferably 0.5% or less.

Additionally, the virtual tread line 10 is defined as the arcuate curve of a single radius of curvature which extends between the axially inner edges Ea, Ea of the shoulder ground-contacting surfaces 12 and is in contact with tangent lines to the shoulder ground-contacting surfaces 12 at the axially inner edges Ea thereof. When the tangent is approximately parallel, the virtual tread line 10 is formed as a straight line connecting between the inner edges Ea, Ea.

In the invention, the convex central part 9 provides a sub-tread having a radius of curvature which is comparatively small and a width sufficiently narrower than the tire's width in the center of tire, thus, the hydroplaning phenomenon is prevented, and the wet grip performance is increased.

By reducing the radius of curvature of the central part 9, specifically that of the central ground-contacting surface 9B, the water draining performance to outside in both directions is increased, and the water clearing effect on a wet road is enhanced.

Incidentally, in the case where the radius of curvature R2 of the shoulder ground-contacting surface 12 is also reduced, the grip performance on a dry road and steering stability in cornering are reduced due to a reduction of ground-contacting width. Therefore, the radius of curvature R2 of the shoulder ground-contacting surface 12 should be comparatively large, preferably 3 or more time the ground-contacting width TW. It is also allowable for the shoulder ground-contacting surface 12 to be approximately a straight line parallel with the tire's axis.

Figure 2:
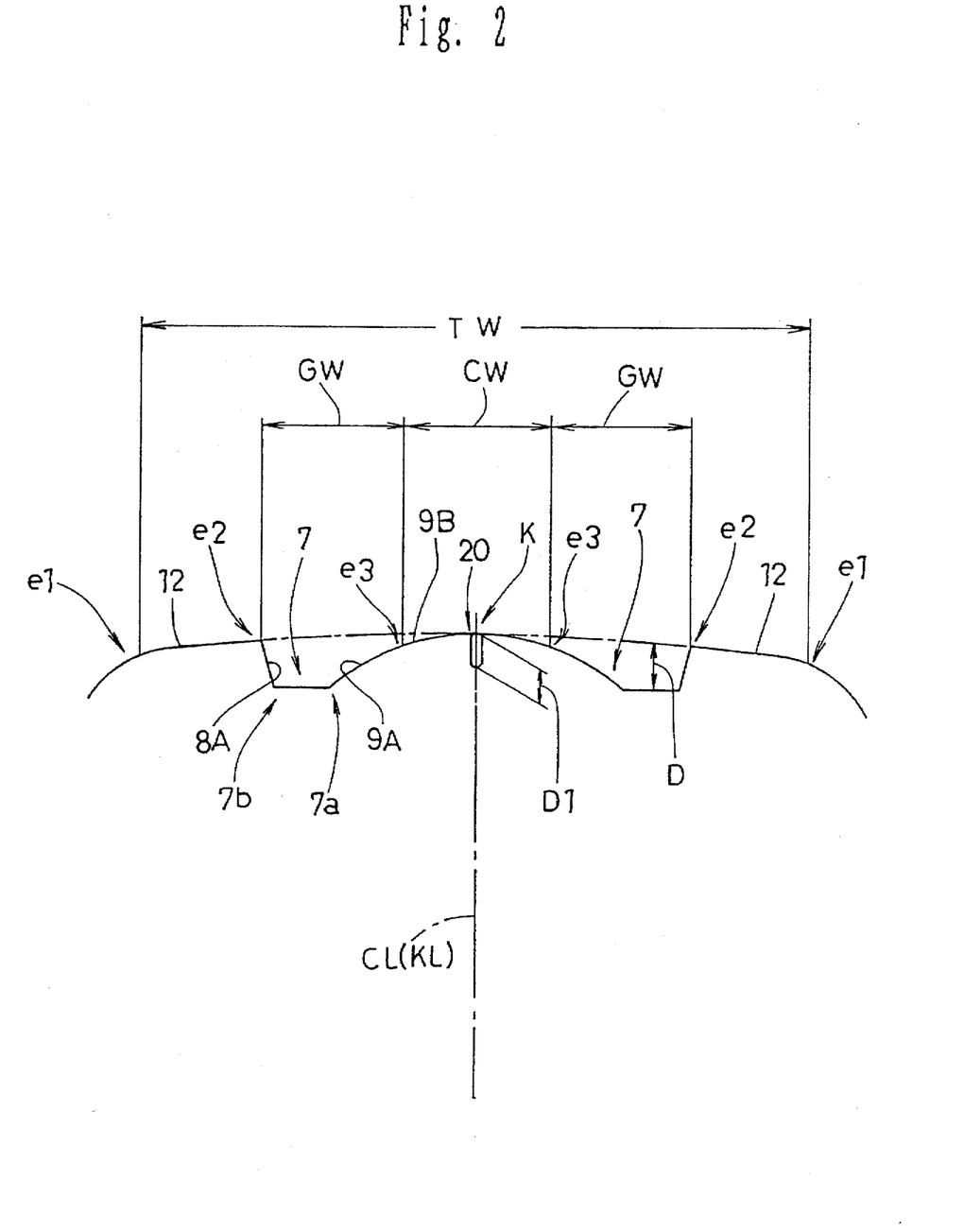
FIG. 2 is a enlarged sectional view showing a central part configuration.

FIGS. 1 and 2 show an example with the surface of the central part 9 formed by an arc with a radius of curvature R1.

The radius of curvature R1 is sufficiently smaller than the radius of curvature R2 of the shoulder part 8, and the convex curve of the central part 9 is inscribed with the virtual tread line 10 in the example. In FIG. 1, the distance L is drawn on purpose to explain the phrase "substantially in contact".

It is also preferable that the radius of curvature R1 is set within a range of 0.4 to 1.5 times, more preferable 0.45 to 0.55 times the ground-contacting tread width TW. If it is less than 0.4 times, a width CW of the central ground-contacting surface 9B is too reduced, and the dry grip performance tends to be significantly reduced. If it is more than 1.5 times, the draining effect is insufficient, and the wet grip performance is inferior. In the embodiment, both radii of curvature R1, R2 have their centers on the tire's equatorial surface, and the shoulder part 8 is provided with an arcuate part with a radius of curvature smaller than the radius of curvature R2 in the vicinity of the axially outer edge of the ground-contacting tread area F.

Figure 14:
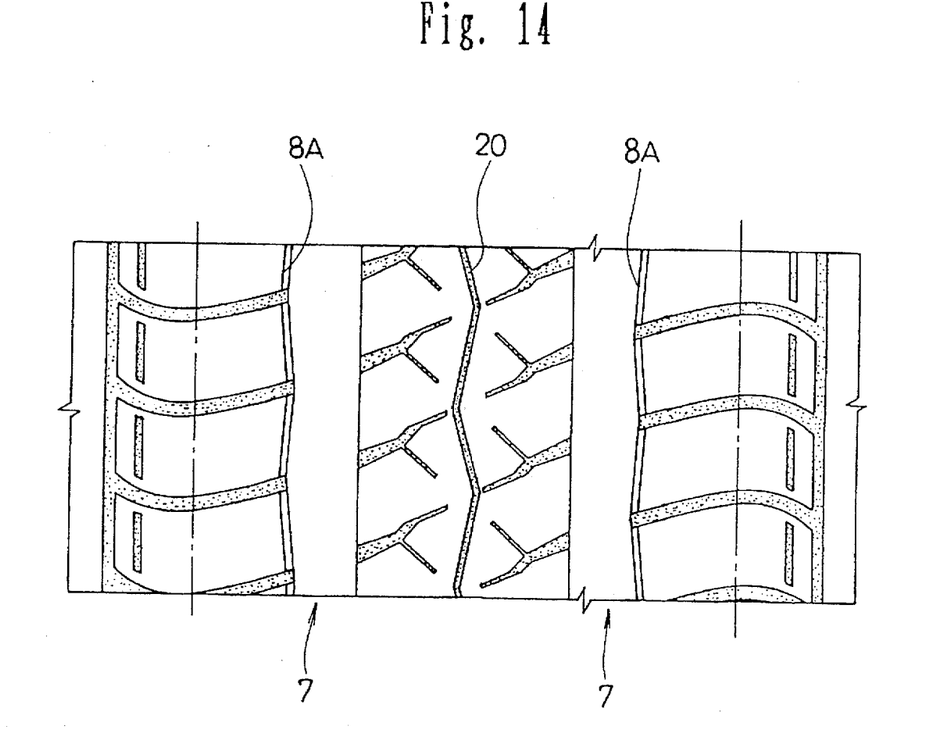
FIG. 14 is a partial flat view of a tread pattern showing another example of circumferential grooves and circumferential radiation grooves.

Furthermore, in the shoulder part 8, it is desirable that the outer groove wall 8A of the groove 7 is formed by a relatively steep and non-arcuate line such as a straight line, at an angle α of 0 to 40 degrees, preferably 5 to 25 degrees to a radial line X of tire, so that an edge effect on a road surface is provided at the inner edge Ea of the shoulder part 8 with a high ground-contacting pressure to help maintain the dry grip performance by increasing lateral force, and thereby cornering power. The outer groove wall 8A may be formed as a convex curve similar to the inner groove wall 9A, or extended in a zigzag, as shown in FIG. 14, to increase traction.

Figure 5:
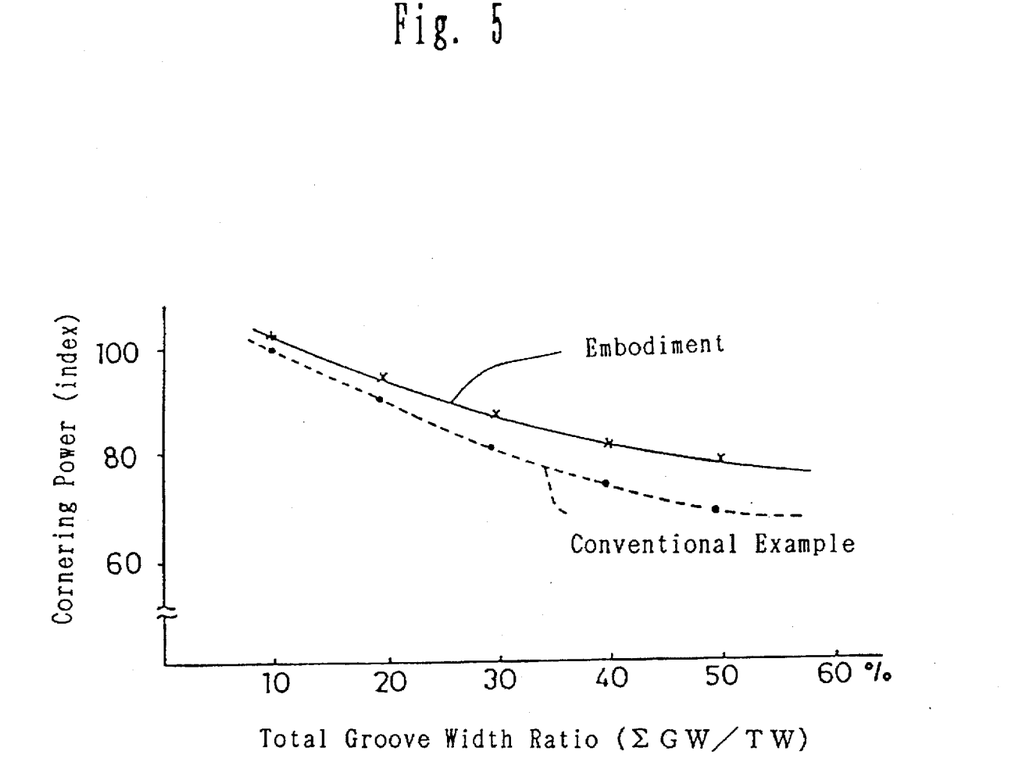
FIG. 5 is a diagram showing the relation between the total groove width ratio and cornering power.
Figure 15:
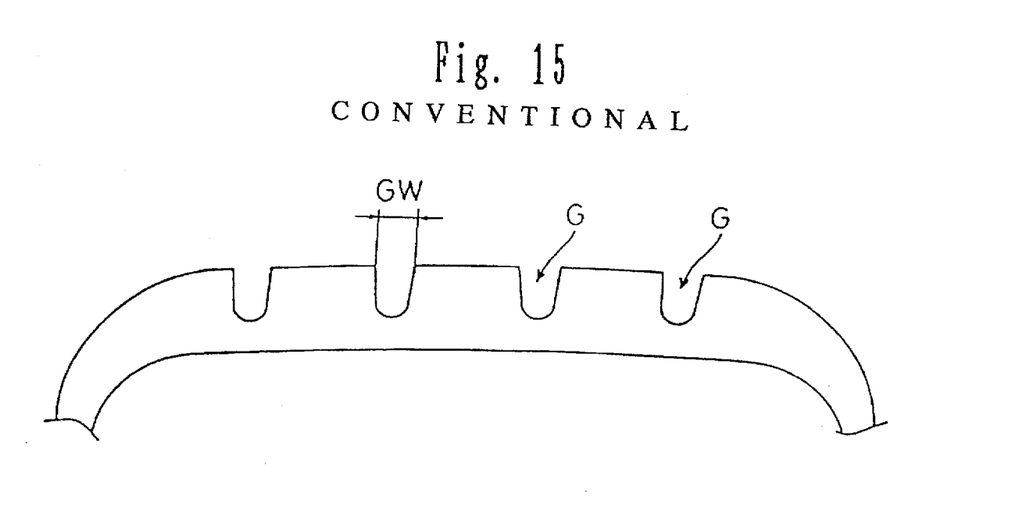
FIG. 15 is a sectional view showing a tread profile of a conventional tire.

Regarding the circumferential groove 7, it was found that a total groove width ratio 2 GW/TW of a total groove width 2 GW of the circumferential grooves 7 to the ground-contact tread width TW affects the cornering power and wet grip performance. FIG. 5 shows the result of measuring the cornering power of a tire of 205/55 R15 in size with a central part in a form of a single arc as shown in FIG. 1 and a conventional tire with four circumferential grooves G as shown in FIG. 15 by changing the total groove width ratio ΣGW/TW. For the total groove width ratio, a value of the ratio 2 GW/TW was employed for the embodiment, and a value of the ratio (ΣGW)/TW for the conventional example. The cornering power was measured on a drum tester in the normal state. It was shown that the embodiment shows a higher value in comparison with the conventional tire. This is considered to be because, when the total groove width ratio defined as above is constant, the inner groove wall 9A of the convex curve contributes to increasing the tire's lateral rigidity.

Figure 6:
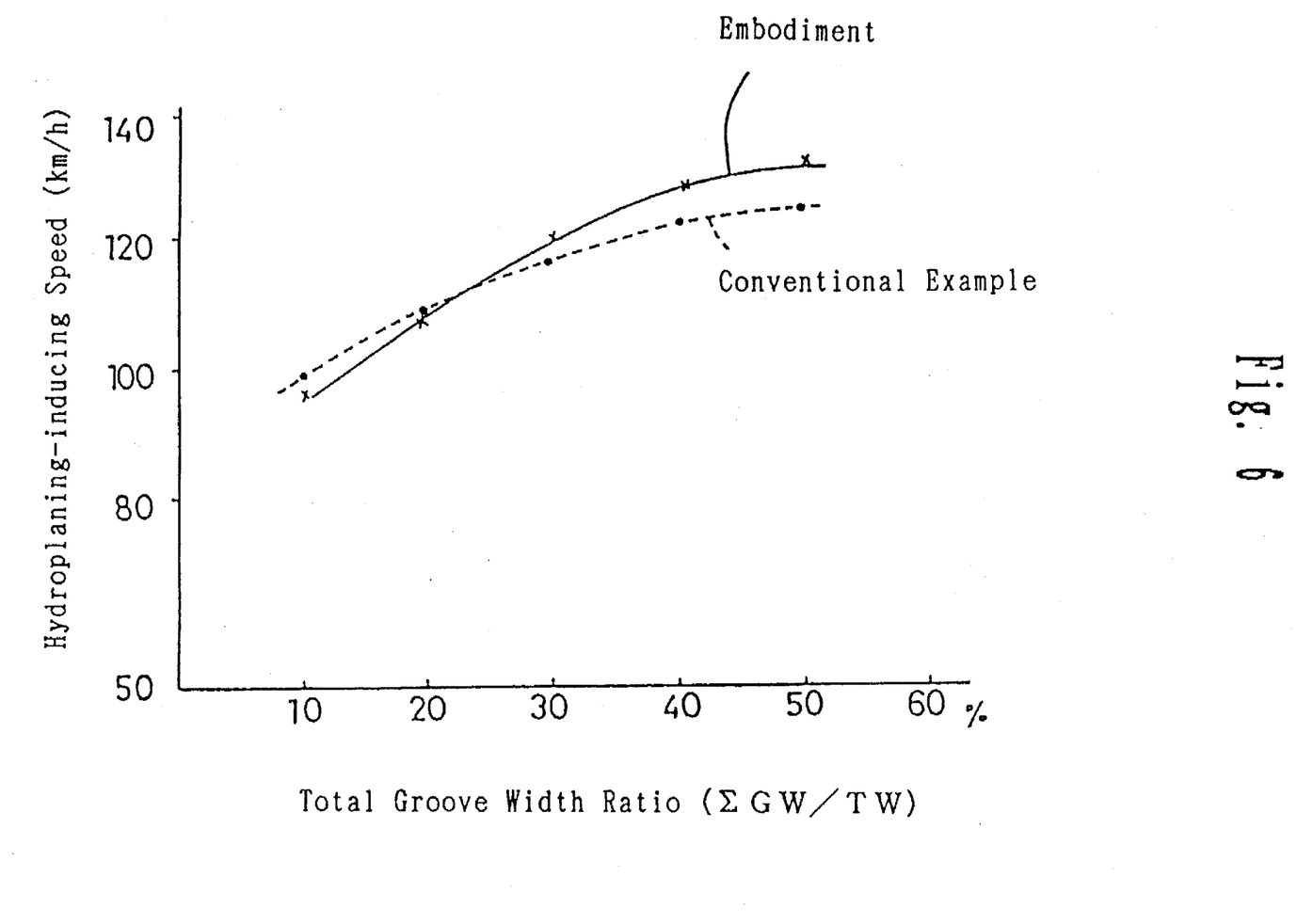
FIG. 6 is a graph showing the relation between the total groove width ratio and hydroplaning-inducing speed.

FIG. 6 shows the result of measuring, in a similar manner, the hydroplaning inducing speed. It was shown that the hydroplaning phenomenon occurred at a higher speed in the embodiment, compared to the conventional tire. This is considered to be because the circumferential groove 7 forms a widened part 13 as shown in FIG. 7 at the front and the back of the ground-contacting center Q, when the tire comes in contact with the ground. The widened part 13 increases the draining performance. Incidentally, in the case where the value of the ratio (Σ, GW)/TW exceeds 50%, the increasing of the inhibitory effect of hydroplaning phenomenon is not expected as shown in FIG. 6, and the cornering power becomes insufficient. Therefore, the value of the ratio (ΣGW)/TW is preferably less than 50%, more preferably less than 45%.

Also, the widened part 13 prevents occurrence of the columnar resonance in the circumferential groove 7, thereby performing the reduction of tire noise.

Figure 8:
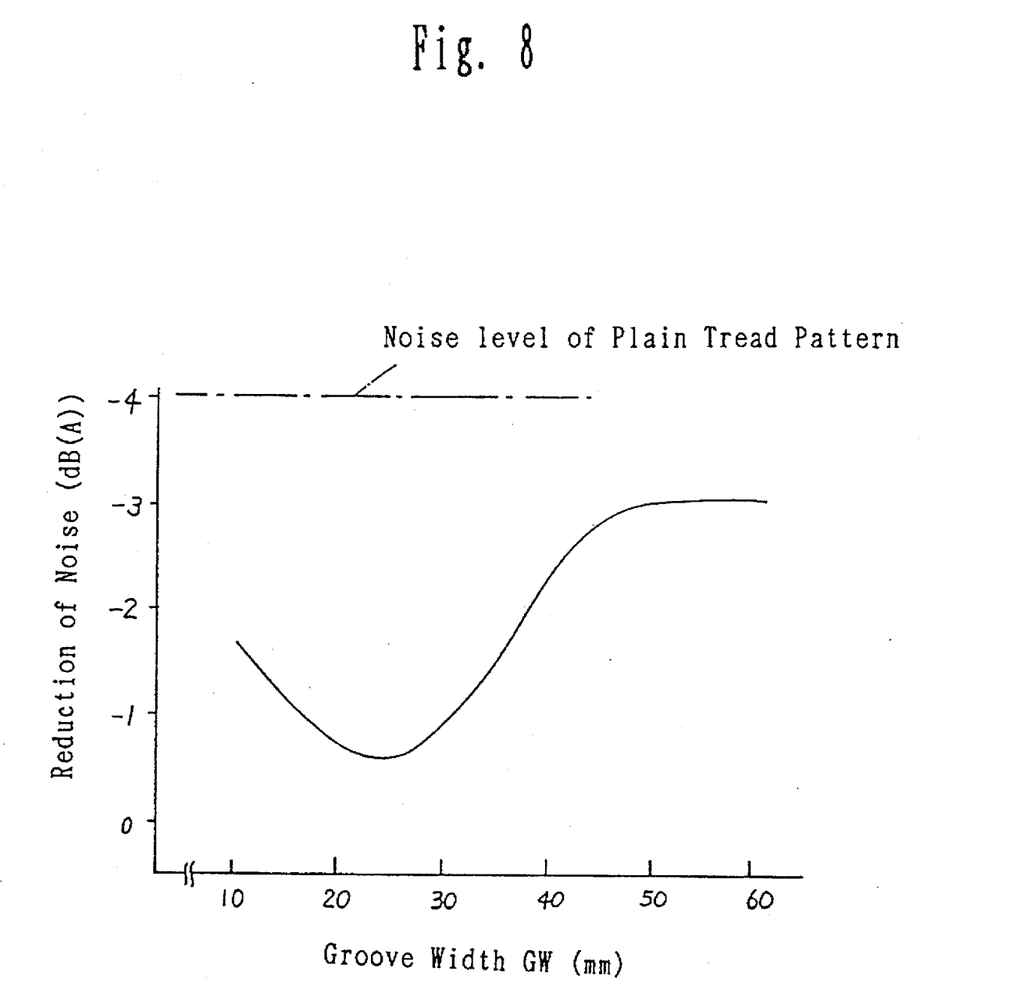
FIG. 8 is a diagram showing a result of a noise test.

To further enhance the inhibitory effect of air column resonance, the groove width GW of the circumferential groove 7 must be 35 mm or more, preferably 40 mm or more. It is known from the result in FIG. 8 showing the measurement of pass-by noise by varying the groove width GW at a fixed groove depth of the circumferential groove 7. As shown in FIG. 8, the pass-by noise reaches the peak at the groove width GW of 25 mm, and then drops suddenly, and an excellent low noise characteristic is noted at 35 mm and over. Nevertheless, although the tire of the invention has a high cornering power as shown in FIG. 5, the increase in the groove width W decreases the ground contact area, then the balance of the ground-contacting stability tends to lower, thereby lowering the steering stability.

In the invention, therefore, in order to maintain a high steering stability while exhibiting the low noise performance and hydroplaning resistance, a length Lc of the ground-contacting area Fc in the circumferential direction is defined at 0.9 or more times a length Ls of the ground-contacting area Fs in the circumferential direction as shown in FIG. 7. Thus, since the length Lc of the ground-contacting area Fc of the central part 9 is increased, the directional stability is enhanced, and the ground-contacting performance in a limited ground-contacting width is improved, so that the steering stability may be upgraded. Meanwhile, if the length Lc is smaller than 0.9 times the length Ls, the steering stability is insufficient, and if exceeding 1.1 times, the steering stability is enhanced, but the wear amount in the central part 9 increases remarkably, and the wear life is shortened. Hence, the length Lc should be 0.9 to 1.1 times the length Ls.

Figure 9:
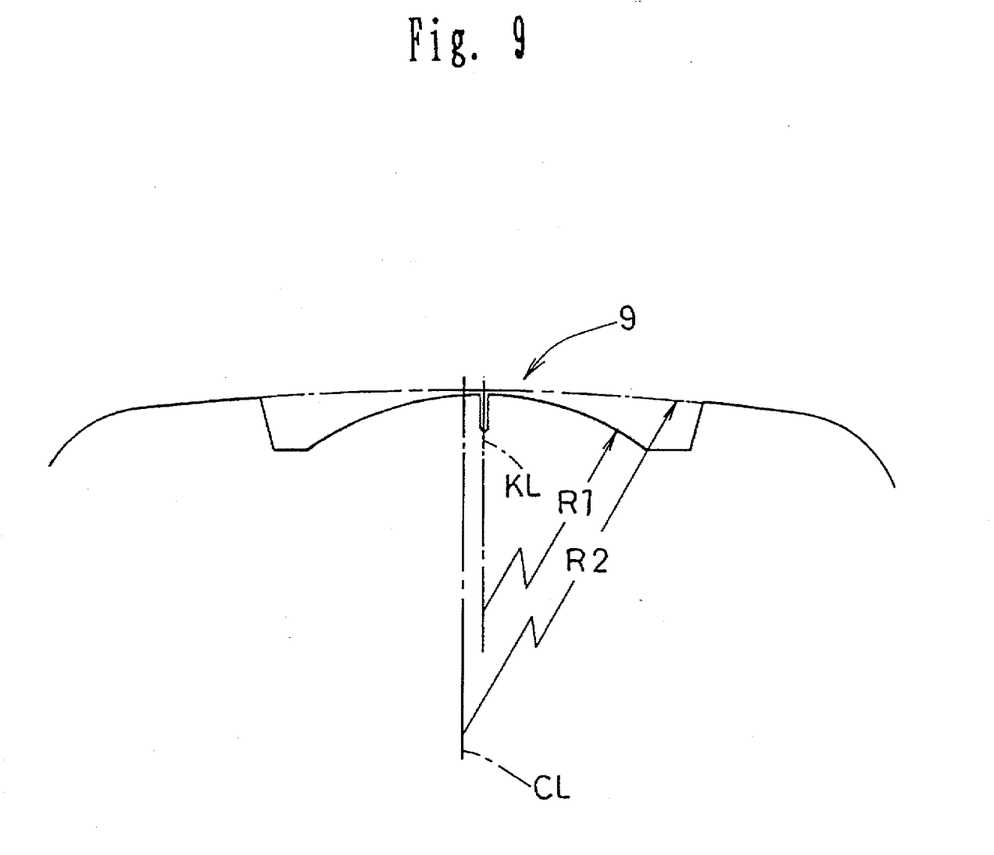
FIG. 9 is a sectional view of a tire showing another example of a central part configuration.

This embodiment relates to a symmetrical tread profile having a same groove width GW in right and left circumferential grooves 7, but it may be asymmetrical by varying the groove width GW, or, as shown in FIG. 9, the central plane KL of the central part 9 may be deviated to a position remote from the equatorial plane of the tire.

Figure 10:
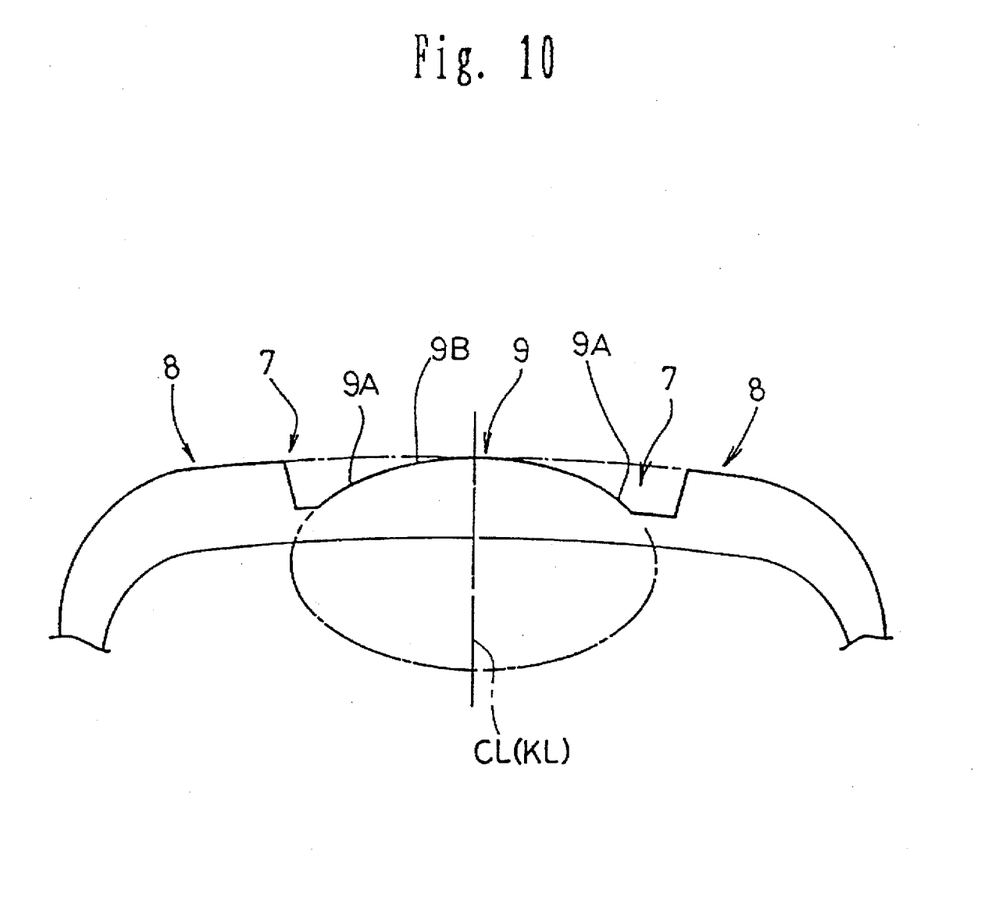
FIG. 10 is a sectional view of a tire showing still another example of a central part configuration.

Incidentally, although the surface of the central part 9 is formed by a single arc in the embodiment shown in FIG. 1, it may be formed in an elliptic shape, as shown in FIG. 10, or a curve approximate to an ellipse.

Figure 11:
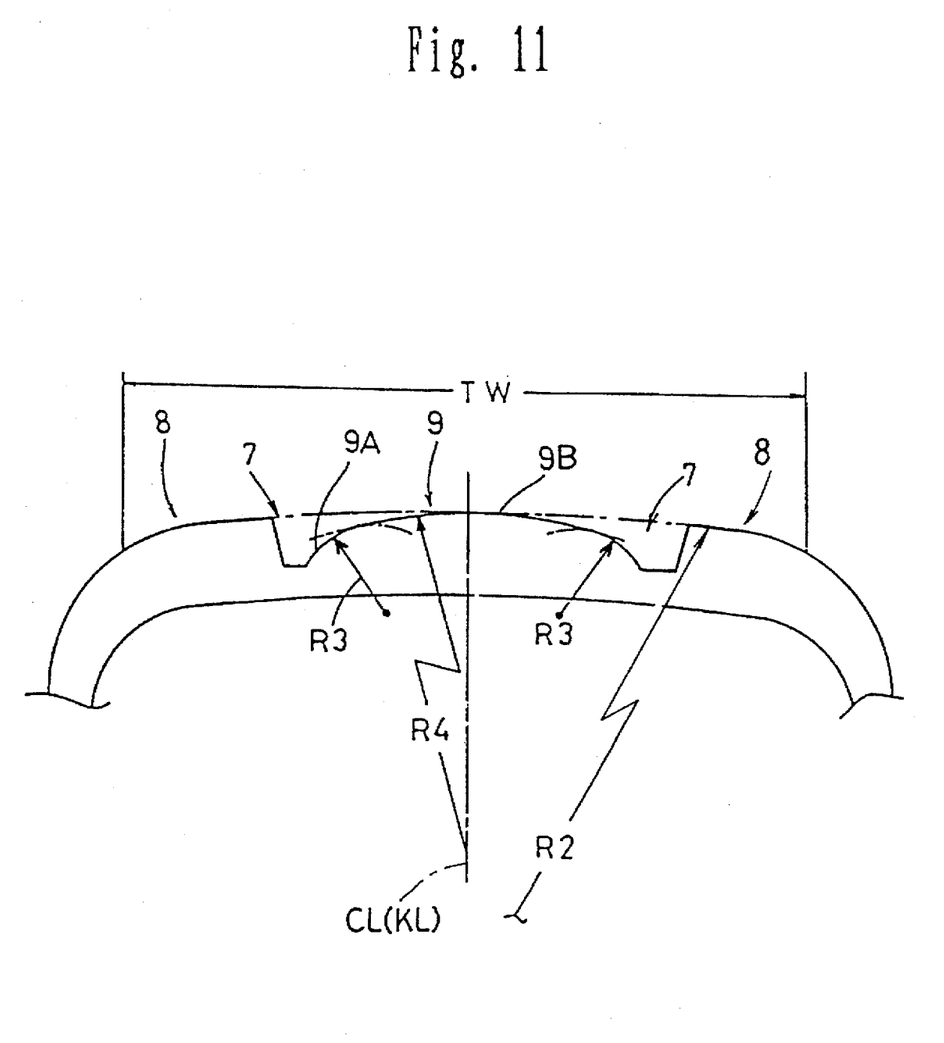
FIG. 11 is a sectional view of a tire showing yet another example of a central part configuration.

FIG. 11 shows that the groove wall 9A and the central ground-contacting surface 9B have different radii of curvature R3, R4. The radius of curvature R3 is less than the radius of curvature R4 of the central ground-contacting surface 9B and the radius of curvature R2 of the shoulder ground-contacting surface 12, respectively, and the lowest limit thereof is preferably 5% or more of the ground-contacting tread width TW. If it is less than 5%, the draining effect tends to be insufficient. The highest limit is at a value identical to the radius of curvature R4, and then the central surface is formed by a single arc. The radius of curvature R4 can be close to the radius of curvature R2 as far as the wet grip performance is not inferior.

Figure 12:
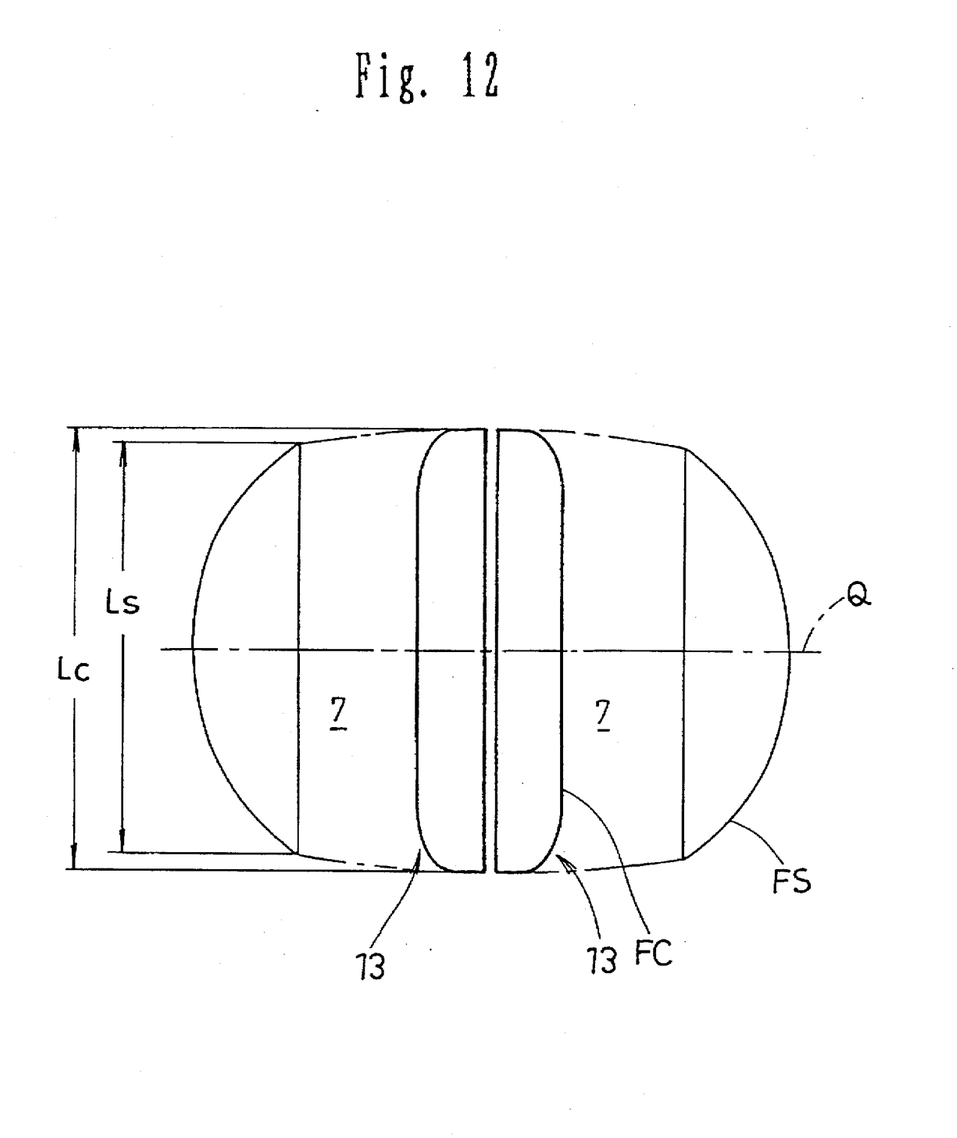
FIG. 12 is a plan view showing a typical ground-contacting tread area of the tire in FIGS. 10 and 11.

Incidentally, when the surface of the central part 9 is formed in an elliptic shape, as shown in FIG. 10, or a curve approximate to an ellipse by a plurality of arcs, as shown in FIG. 11, the radius of the central ground-contacting surface 9B becomes relatively greater. As the result, the shape of the ground-contacting area Fc approximates to an rectangle, as shown in FIG. 12, thereby increasing the ground-contacting area and improving wear durability and steering stability.

In the embodiment, also, the central part 9 is provided with a radiation groove 21 including at least a circumferential radiation groove 20 for heat release as shown in FIG. 4.

The radiation groove 21 comprises, in the embodiment, a circumferential radiation groove 20 and lateral radiation grooves 22. The circumferential radiation groove 20 is formed as a narrow groove continuously extending substantially along the central plane KL. The radiation groove 20 is capable of maintaining the pattern rigidity, while providing a heat radiation effect, by setting the groove depth D1 thereof at 0.4 to 0.9 times the groove depth D of the circumferential groove 7, and a groove width W1 at 5 mm or less. If the groove width W1 is more than 5 mm, and the groove depth D1 is more than 0.9 times the groove depth D, then columnar resonance is caused. If the groove depth D1 is less than 0.4 times the groove depth D, the heat radiation effect is insufficient.

The lateral radiation groove 22 extends from a position of an inner end spaced from the circumferential radiation groove 20 toward the outside in the axial direction of tire at an inclination θ of 10 degrees or more to the axial direction of tire, and an outer end thereof opens into the circumferential groove 7.

Thus, because the lateral radiation groove 22 is spaced from the circumferential radiation groove 20, the rigidity of the central part 9 is maintained, and the steering stability is assured.

A groove depth D2 of the lateral radiation groove 22 is similarly 0.4 to 0.9 times the groove depth D. If the groove depth D2 is more than 0.9 times the groove depth D, and the inclination θ is less than 10 degrees, then the pitch noise of the lateral radiation groove 22 is excessively high. If the groove depth D2 is less than 0.4 times the groove depth D, a sufficient heat radiation effect cannot be expected.

In the circumferential and lateral radiation grooves 20 and 22, an angle established by a groove wall in the grooves 20, 22 and a normal on the tread surface, that is, the inclination gradient of the groove wall is set at 15 degrees or less, more preferably 5 degrees or less, respectively, and a dimensional change of the radiation groove 21 due to wear of the tire is thereby controlled.

In the embodiment, a shoulder groove 23 is additionally formed in the shoulder part 8. Each shoulder groove 23 is an open groove with an inner end thereof opening in the circumferential groove 7 and an outer end in the tread end. Thus, by opening it in the circumferential groove, the heat radiation effect is further increased, increase of temperature in the shoulder groove 8 is significantly reduced, and the draining performance is enhanced.

Figure 13:
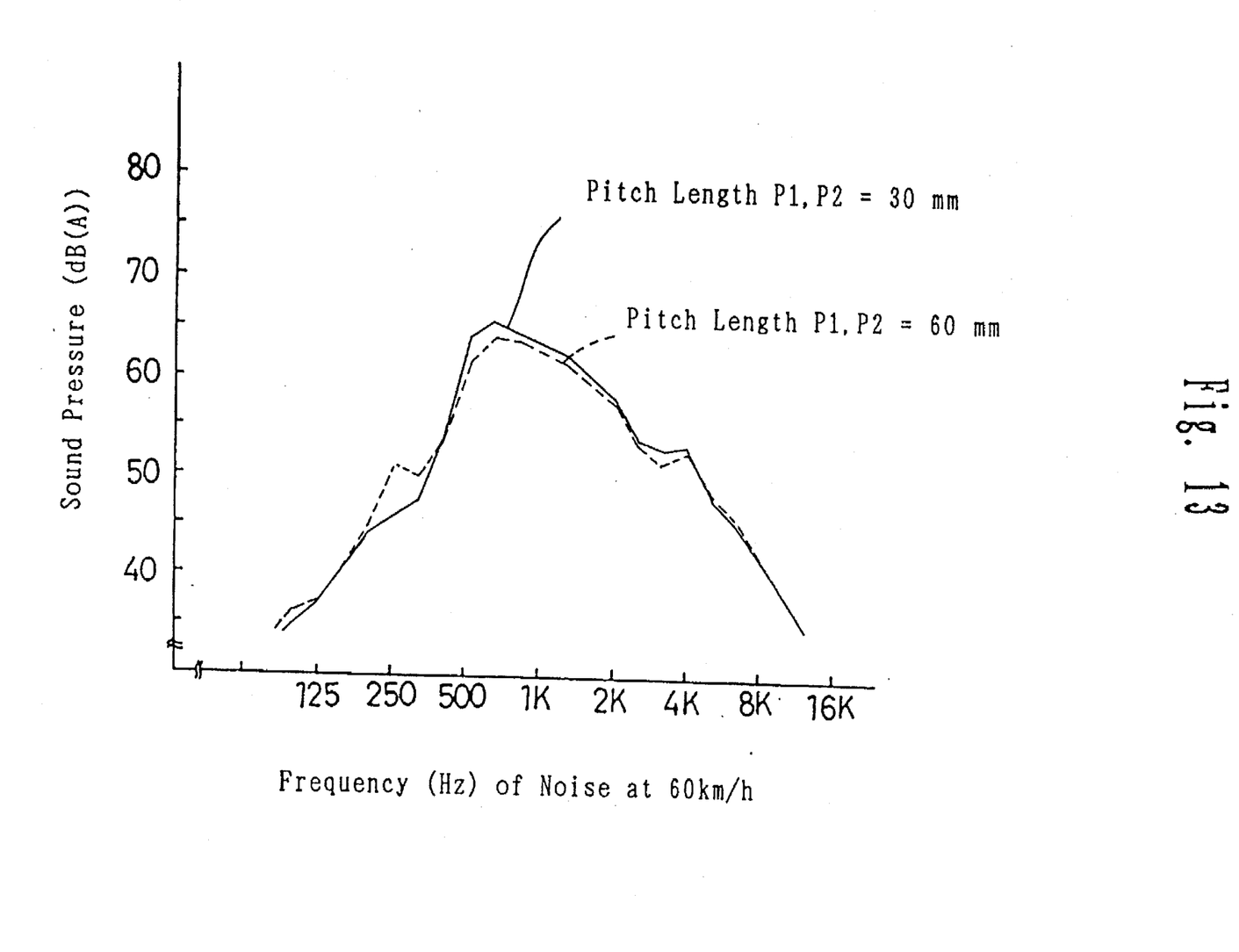
FIG. 13 is a graph showing a result of frequency analysis of tire noise in an embodiment of the invention.

An average pitch length of a lateral groove in the circumferential direction of tire is generally about 30 mm, and the resultant primary frequency at a speed of 80 km/h, for example, is 500 to 800 Hz, thus, showing a coincidence with a frequency of noise peak in a tire with a tread profile having the convex central part 9, as shown in FIG. 13. Therefore, in the embodiment, an average pitch length P1 of the lateral radiation groove 22 and an average pitch length P2 of the shoulder groove 23 are preferably set at 40 mm or more, respectively, so that a primary pitch frequency of the grooves 22, 23 are different from the noise peak.

FIG. 14 shows another example of radiation grooves 21 and the circumferential grooves 7. The groove walls of the circumferential radiation grooves 20 and the groove wall 8A of the circumferential groove 7 may be formed as a zigzag.

EXAMPLE

A tire of 205/55 R15 in size was produced according to specifications shown in Table 1, and measured for the steering stability and wear durability. The results of the measurement are shown in the table. The test tires have a same tread profile, and the balance between the lengths Lc, Ls was changed by changing the width of the belt layer 4, the angle of the belt cords or constructions of bandage layer provided on the belt layer 4. The tires were tested and measured in the state mounted on its regular rim R and inflated with regular internal pressure (2.4 ksc) and applied with normal load (450 kg).

TABLE 1

|  | Embodiment | | | Comparative | |
| --- | --- | --- | --- | --- | --- |
|  | 1 | 2 | 3 | 1 | 2 |
| Tread Profile | FIG. 2 | FIG. 2 | FIG. 2 | FIG. 2 | FIG. 2 |
| Groove Width GW (mm) | 42 | 40 | 41 | 42 | 42 |
| Ground-Contacting Tread Width TW (mm) | 166 | 160 | 152 | 170 | 150 |
| Length Lc (mm) | 112 | 110 | 122 | 107 | 130 |
| Length Ls (mm) | 119 | 115 | 114 | 126 | 113 |
| Ratio Lc/Ls | 0.94 | 0.96 | 1.07 | 0.85 | 1.15 |
| Steering Stability (*1) | 3 | 3~3⁻ | 3⁻ | 3⁻~2.5 | 3⁻~2.5 |
| Wear Durability of Central Part (*2) | 94 | 100 | 105 | 92 | 113 |

(*1) Steering Stability was evaluated by the driver's feeling, and indicated as the index 5. The greater figure means the better performance.
(*2) Wear amount after driving was measured, and indicated as the index with the embodiment 2 taken as 100. The greater figure means the worse performance.

What is claimed is:

1. A pneumatic tire comprising a tread part having two circumferential grooves continuously extending in the circumferential direction, one of said circumferential grooves being disposed on one side of the tire's equator and the other of the circumferential grooves being disposed on the other side of the tire's equator so as to divide the tread part into a pair of shoulder parts, which are located outside outer bottom edges of the circumferential grooves in the axial direction of tire, and a central part, the central part being located between inner bottom edges of the circumferential grooves in the axial direction of the tire; wherein the central part has a surface configured by an arc of a single radius of curvature R1 composed of a pair of inner groove walls, each of the inner groove walls extending inward in the tire's axial direction from the inner bottom edges, and a central ground-contacting surface smoothly connected between the pair of the inner groove walls, the radius of curvature R1 is in a range of 0.45 to 0.55 times a ground-contact tread width TW, the central ground-contacting surface is substantially in contact with a virtual tread line between outer surfaces of the shoulder parts, and when the tire is mounted on a regular rim, inflated with regular internal pressure and applied with normal load, a ground-contacting area Fc where the central part contacts with the ground has a length Lc in the tire's circumferential direction which is 0.94 to 0.96 times a length Ls in the tire's circumferential direction of a ground-contacting area FS where the shoulder part contacts with the ground.

2. The pneumatic tire according to claim 1, wherein the circumferential grooves have a groove width GW being in a range of 35 mm or more.

3. The pneumatic tire according to claim 1, wherein the ground-contacting area Fc of the central part has an elliptic shape in the tire's circumferential direction.

4. The pneumatic tire according to claim 1, wherein a groove width GW of one of the circumferential grooves differs from a groove width GW of the other of the circumferential grooves.

5. The pneumatic tire according to claim 1, wherein a central plane of the central part is deviated to a position remote from the equatorial plane of the tire.

6. The pneumatic tire according to claim 1, wherein an aspect ratio of the tire is in a range of 0.4 to 0.6.

7. The pneumatic tire according to claim 1, wherein the circumferential grooves have a groove depth D being in a range of 4 to 8% of the ground-contract tread width TW.

8. The pneumatic tire according to claim 1, wherein an outer groove wall of the circumferential groove extends along a straight line at an angle of 0 to 40 degrees to a radial line of the tire.

9. The pneumatic tire according to claim 1, wherein an outer groove wall of the circumferential groove extends along a straight line at an angle of 5 to 25 degrees to a radial line of the tire.

10. The pneumatic tire according to claim 1, wherein the ratio Lc/Ls of the length Lc to the length Ls is 0.94.

11. The pneumatic tire according to claim 1, wherein the circumferential grooves have a groove width GW being in a range of 40 mm or more.

* * * * *